United States Patent Office 3,301,704
Patented Jan. 31, 1967

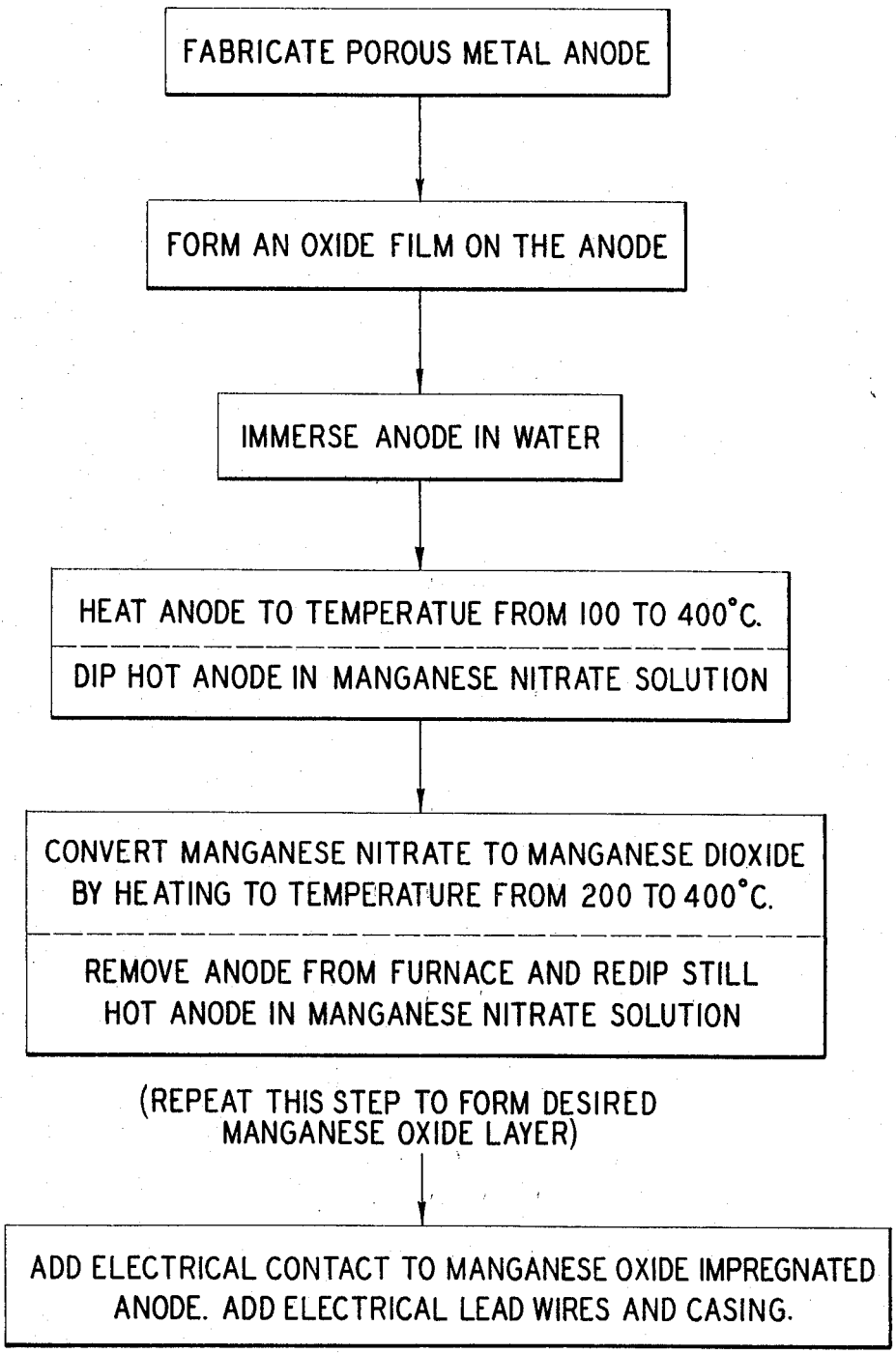

3,301,704
CAPACITOR AND PROCESS THEREFOR
Frederic F. Zind, North Olmsted, Ohio, assignor to Union Carbide Corporation, a corporation of New York
Filed Dec. 26, 1963, Ser. No. 333,656
14 Claims. (Cl. 117—200)

This invention relates to a capacitor having a solid or dry electrolyte. More particularly, it relates to a solid electrolyte capacitor having improved dissipation factor and to an improved process for making such a capacitor employing the step of contacting oxidized anodes at a temperature above 100° C. with an aqueous solution of manganese nitrate which is below about 70° C.

Solid electrolyte capacitors are known in the art. According to prior art methods they are generally prepared by sintering particles of a metal capable of forming an oxide surface film thereon, such as tantalum, aluminum, tungsten, columbium, hafnium, titanium and zirconium, to form a porous metal anode. Tantalum is the preferred metal. Such an anode is then coated with an oxide layer, such as tantalum oxide, by an electrolytic process. The resulting anode oxide layer forms the dielectric between the anode and a subsequently applied cathode layer. The successful operation of the resulting capacitor depends to a large extent upon the quality of this anode oxide layer. In order to improve the quality of the anode oxide layer, the oxidized porous metal anode is dipped into a concentrated manganese nitrate solution at normal ambient room temperature. The dipped anode is then removed from the manganese nitrate solution and placed in an oven where it is heated to a high temperature (about 200° C.–400° C.) in order to convert the manganese nitrate to manganese oxide. The dipping and heating steps are generally repeated several times in order to provide as complete filling of the pores of the anode with manganese oxide as possible. The anodes after removal from the oven are allowed to cool to ambient room temperature (about 18–25° C.) before being reimmersed in the room temperature manganese nitrate solution. Such cooling has been considered essential in order to prevent boiling or volatilization of liquid from the manganese nitrate solution, and also to minimize thermal shock to the treated anode. Following several such dippings and heatings the anode is oxidized again by an electrolytic process to carry out the "healing" operation on the previously formed anode oxide layer.

The "healing" operation is accomplished by known methods of electrolytically reoxidizing the anode. During this process, only the manganese oxide in and around any defects in the anode oxide layer is converted further to other more insulating forms of manganese oxide. This converted manganese oxide helps reduce direct current leakage through any defects in the anode oxide dielectric layer. The remaining portion of the manganese oxide acts as the dry electrolyte for the capacitor. The cathode is then prepared by conventional methods of applying a conductive layer to the processed anode. Preferably, a graphite layer is applied to the oxidized anode before the cathode layer is applied. The capacitor is completed by attaching leads to the anode and cathode and sealing the components inside a suitable case.

It has been found that while capacitors prepared by the above-described process are generally satisfactory for most electronic applications, they are unsatisfactory for some uses because of their high dissipation factors. The dissipation factor of a capacitor is a function of the ratio of dissipated energy in the capacitor to the stored energy in the capacitor. It is, in effect, a measure of the energy dissipated in an equivalent series resistance. It is desirably low. When an alternating field is applied across a capacitor, the nature of the capacitor dielectric gives rise to a displacement current within the dielectric which leads the field variation by a 90° phase angle if it is a perfect dielectric, and all the applied field energy is stored in the capacitor. If any energy is dissipated in the dielectric, the phase angle is reduced below 90°. The dissipation factor is measured as the cotangent of the above-mentioned phase angle and is generally expressed as 100 times the cotangent of the phase angle or as "percent." For many electronic applications and in particular for military use solid electrolyte tantalum capacitors must meet the specifications of 6% maximum dissipation factor at 25° C. and 120 cycles per second test signal, and 8% maximum dissipation factor at −55° C. and 120 cycles per second test signal. Prior art solid electrolyte capacitors cannot meet such specifications consistently.

It is an object of the present invention to provide a solid electrolyte capacitor having a reduced dissipation factor. It is a further object of the present invention to provide an improved process for making a solid electrolyte capacitor having a reduced dissipation factor.

In accordance with the present invention, an oxidized porous metal anode made from the previously mentioned metals by known techniques, after being washed with water, is preheated to a temperature of from above 100° C. to about 400° C., preferably 200–300° C., and then dipped into an aqueous manganese nitrate solution which has a temperature below 70° C. (the approximate decomposition temperature of the solution) and which is preferably at ambient room temperature. The treated anode is then heated to a temperature of about 200–400° C. in an oven according to prior art procedures to convert the manganese nitrate to manganese oxide within the pores of the anode. The anode is then removed from the oven and, without further cooling, immediately immersed in the relatively cool manganese nitrate solution. This cycle of dipping and heating is repeated several times, for example, from 4–8 times. Subsequent processing to complete the fabrication of the capacitor employs prior art techniques. The resulting novel capacitor meets all specifications for performance including the low dissipation factor required by the aforementioned military specifications.

The manganese nitrate solution employed in the process of this invention is commercially available in aqueous liquid form, and may have a specific gravity of about 1.50–1.70 at 25° C., the preferable range being 1.60–1.65. The heating time and dipping time need be only long enough to permit the temperature of the anode to come to equilibrium with that of the oven and the solution respectively. There is no intentional cooling of the oxidized anodes from the time they are preheated until they are removed from the oven after the last dipping and conversion steps. Substantially the only cooling that occurs is the quench cooling when the hot anodes are dipped into the relatively cool manganese nitrate solution.

While not wishing to be limited by a theoretical explanation, it is believed that the immersion of hot porous anodes into the relatively cool manganese nitrate solution creates low pressure zones within the pores of the anode. Atmospheric pressure then forces manganese nitrate solution into such pores in amounts in excess of that which would result from normal diffusion and capillary action. This low pressure in the pores of the anode is believed to be created as a result of vaporization of water in the pores when the anode is heated above 100° C. followed by condensation of the water vapor when the anode is dipped into the relatively cool solution of manganese nitrate. Upon condensation, a partial vacuum is formed in the pores which draws in the manganese nitrate solution. In order that the above condensation of water vapor take place on the first dip, it is essential that the anode contain some water in the pores, prior to being preheated above 100° C. Preferably, the surfaces of the anode are saturated with water. This is accomplished by washing or dipping the anode into water prior to preheating. Thus, when the dipped anode is heated to convert the manganese nitrate into semi-conducting manganese oxide, such conducting oxide substantially fills the pores of the porous metal anode and provides a greater degree of electrical conduction than previously attained. Consequently, there results a reduction in the series electrical resistance and dissipation factor of the resulting capacitor.

The drawing comprises a chart showing a preferred embodiment of the invention.

The following example is given by way of illustration only in order to further describe the present invention, and is not intended to limit the scope thereof.

EXAMPLE

Five hundred and sixty units of sintered and oxidized tantalum powder anodes intended for use in 220 microfarad, 10 volt tantalum solid electrolyte capacitors were prepared by known techniques. These anodes were then washed with water to substantially saturate the pores, preheated to between 250 and 300° for 70 seconds and immediately immersed for about 45 seconds into manganese nitrate solution having a variable temperature between 25° C. and 70° C. and a specific gravity of 1.60–1.65 at 25° C. The wet anodes were withdrawn from the solution, and then inserted into an oven heated to about 300° C. It required about 35 seconds to move the anodes from the solution to the oven. The anodes remained in the oven for about 5 minutes. After removal from the oven the hot anodes were immediately dipped into the room temperature manganese nitrate solution for about 15 seconds. The wet anodes were then withdrawn from the solution, and again inserted into the oven as described above. This process was repeated for a total of five immersions into the solution and five subsequent heatings. The treated anodes were then processed in a well-known manner to form tantalum solid electrolyte capacitors.

Over 1100 capacitors were tested to see if they met the previously mentioned stringent military specifications. Of the capacitors made by the method of this invention, 100% had a dissipation factor of less than 6% at 25° C. and 120 cycles per second test signal, and 64% had a dissipation factor of less than 8% at −55° C. and 120 cycles per second test signal. By contrast, of the capacitors produced by the conventional prior art method described above only 68% had a dissipation factor of less than 6% at 25° C. and 120 cycles per second test signal, and only 2% had a dissipation factor of less than 8% at −55° C. and 120 cycles per second test signal. Thus, whereas 64% of the capacitors made by the method of this invention passed both tests, only 1.4% of the capacitors made by the methods of the prior art passed both tests. It can be seen therefore that the process of this invention produces a product substantially superior to that of the prior art.

The capacitors of the present invention can be used in any electronic circuit wherein tantalum solid electrolytes are known to be useful. The improvement in dissipation factor provides known utility as well.

What is claimed is:
1. A process for the production of a solid electrolytic capacitor anode comprising the steps of
   (1) preheating an oxidized porous metal anode having occluded water to a temperature above 100° C.,
   (2) dipping the anode while still at a temperature above 100° C. into a solution of manganese nitrate which is at a temperature below about 70° C.,
   (3) removing the anode from the manganese nitrate solution and heating the anode at a temperature from 200 to 400° C. for a time sufficient to convert manganese nitrate to manganese oxide,
   (4) redipping the anode while it is still at a temperature above 100° C. into a solution of manganese nitrate which is at a temperature below about 70° C.,
   (5) repeating steps (3) and (4) a sufficient number of times to effect a desired filling of the pores of the anode with manganese oxide.

2. A process as in claim 1 in which the anode is at a temperature of from 200 to 300° C. when it is first dipped into the solution of manganese nitrate.

3. A process as in claim 1 in which the anode is at a temperature of from 200 to 300° C. each time it is dipped into the manganese nitrate solution.

4. A process as in claim 1 in which the metal of the porous metal anode is selected from the group consisting of tantalum, aluminum, tungsten, columbium, hafnium, titanium, and zirconium.

5. A process as in claim 1 in which an oxidized porous tantalum anode is at a temperature of from 200 to 300° C. each time it is dipped into the manganese nitrate solution.

6. A process as in claim 1 in which an oxidized porous tantalum anode is at a temperature of from 200 to 300° C. each time it is dipped into an aqueous manganese nitrate solution having a temperature of from 25 to 70° C. and a specific gravity of from 1.50 to 1.70 at 25° C.

7. A process as in claim 1 in which the oxidized porous metal anode is first immersed in water and then heated to a temperature over 100° C. and below 400° C. before its first dipping in the manganese nitrate solution.

8. A process for the production of a solid electrolytic capacitor anode comprising the steps of
   (1) preheating an oxidized porous metal anode having occluded water to a temperature above 100° C.,
   (2) dipping the anode while still at a temperature above 100° C. and below 400° C. into an aqueous solution of manganese nitrate which is at a temperature below about 70° C.,
   (3) removing the anode from the manganese nitrate solution and heating the anode at a temperature from 200 to 400° C. for a time sufficient to convert manganese nitrate to manganese oxide,
   (4) taking the heated anode while it is still at a temperature above 100° C. and while there is still vaporized water from the manganese nitrate solution contained in the pores of the anode and dipping the anode into an aqueous solution of manganese nitrate,
   (5) repeating steps (3) and (4) a sufficient number of times to effect a desired filling of the pores of the anode with manganese oxide.

9. A process as in claim 8 in which the oxidized porous metal anode is first immersed in water and then heated to a temperature over 100° C. and then dipped into the solution of manganese nitrate while the anode is still at a temperature over 100° C. and below 400° C.

10. A process as in claim 8 in which an oxidized porous tantalum anode is first immersed in water and then heated to a temperature from 200 to 300° C. and then while the anode is still at a temperature over 200° C. and while there is still vaporized water in the pores of the anode, the anode is dipped in the solution of manganese nitrate.

11. A process as in claim 10 in which the anode is removed from the manganese nitrate solution, heated to a temperature from 200 to 300° C. to convert manganese nitrate to manganese oxide, and then while the anode is still at a temperature from 200 to 300° C. and while there is still vaporized water from the manganese nitrate solution in the pores of the anode, the anode is redipped in manganese nitrate solution, and then repeating a sufficient number of times to effect a desired filling of the pores of the anode with manganese oxide.

12. A process as in claim 11 in which the aqueous manganese nitrate solution has a specific gravity of from 1.60 to 1.65 at 25° C. and is at a temperature of from 25 to 70° C.

13. A process as in claim 11 in which the oxidized porous metal anode having the desired manganese oxide filling in the pores thereof is then electrolytically reoxidized and a conductive cathode layer is applied thereto.

14. A solid electrolytic capacitor anode prepared by the process of claim 1.

References Cited by the Examiner

UNITED STATES PATENTS

| | | | |
|---|---|---|---|
| 2,936,514 | 5/1960 | Millard | 317—230 |
| 2,981,647 | 5/1961 | Schwartz | 204—38 |
| 2,989,447 | 6/1961 | Power | 317—230 |
| 3,093,883 | 6/1963 | Haring et al. | 317—230 |
| 3,127,660 | 5/1964 | Gerondeau | 317—230 |

FOREIGN PATENTS

| | | |
|---|---|---|
| 160,620 | 1/1955 | Australia. |
| 1,109,793 | 6/1961 | Germany. |
| 1,120,599 | 12/1961 | Germany. |

RALPH S. KENDALL, *Primary Examiner.*

RICHARD D. NEVIUS, ALFRED L. LEAVITT,
*Examiners.*

W. L. JARVIS, *Assistant Examiner.*